Nov. 27, 1923.

G. W. MacKENZIE

LIQUID MEASURING APPARATUS

Filed Jan. 17, 1920    2 Sheets-Sheet 1

1,475,844

Nov. 27, 1923.
G. W. MacKENZIE
LIQUID MEASURING APPARATUS
Filed Jan. 17, 1920    2 Sheets-Sheet 2
1,475,844
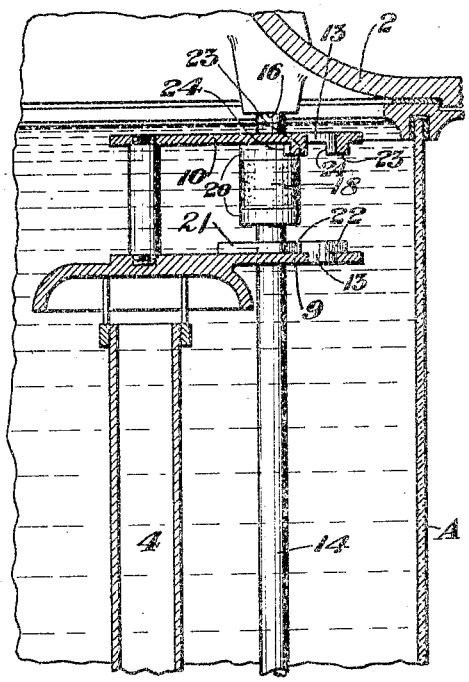
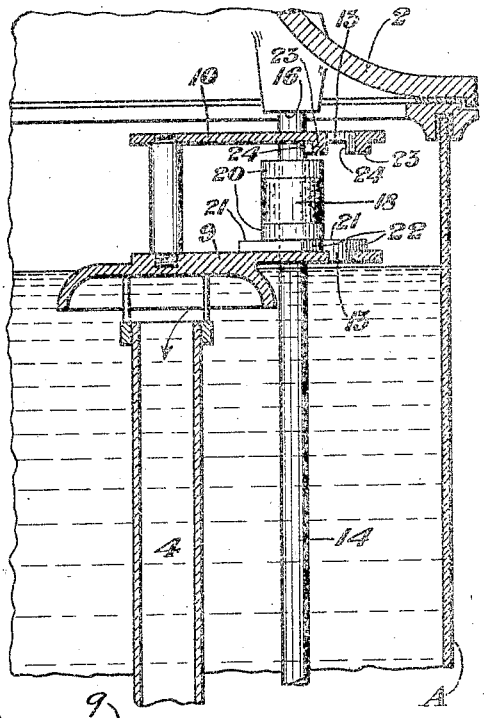
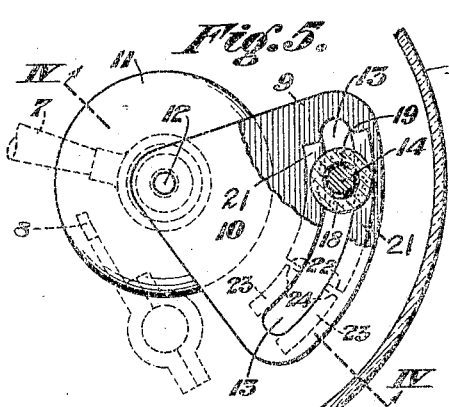
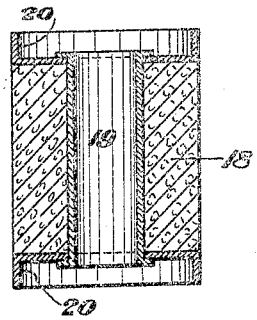
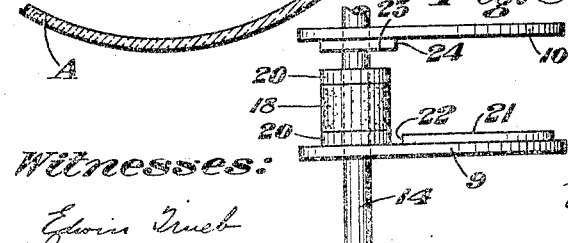

Patented Nov. 27, 1923.

1,475,844

UNITED STATES PATENT OFFICE.

GEORGE W. MacKENZIE, OF BEAVER, PENNSYLVANIA, ASSIGNOR TO GUARANTEE LIQUID MEASURE COMPANY, OF ROCHESTER, PENNSYLVANIA, A CORPORATION OF DELAWARE.

LIQUID-MEASURING APPARATUS.

Application filed January 17, 1920. Serial No. 352,015.

*To all whom it may concern:*

Be it known that I, GEORGE W. MAC-KENZIE, a citizen of the United States, residing at Beaver, in the county of Beaver and State of Pennsylvania, have invented certain new and useful Improvements in Liquid-Measuring Apparatus, of which the following is a specification.

My invention relates to the class of liquid measuring apparatus of the kind adapted to the vending of measured amounts of gasoline or other liquids.

The present improvement is designed to prevent improper or fraudulent use of the machine by rendering it impossible to return to the main tank any portion of a measured quantity or to divert it from the purchaser, or to withdraw any liquid from the purchaser's tank by suction, or to in any manner operate the machine to deliver less than the indicated measured amount.

The invention is shown as applied to a machine like that of my prior Patent No. 1,297,210, dated March 11, 1919, and utilizes a measuring tank into which the liquid is charged, preferably by suction, i. e., atmospheric pressure due to exhaustion of air from the measuring tank through a vertically adjustable feed and return pipe having means for positively locating it at any predetermined measuring level, the surplus returning therethrough, leaving the measured amount level with its top, after which the full contents are withdrawn and delivered to the purchaser, upon equalization of atmospheric pressure.

The objects of the invention are secured by means of a locking float and co-operating rotatable abutment plates attached to the upper portion of the feed and return pipe and a fixed guide for the float whereby to control its vertical movement in a constant controlling line of travel.

The drawings show the operative mechanism in varying positions, illustrating the construction and operation, in which:

Fig. 4 is a view similar to Fig. 1, on the line IV—IV of Fig. 5, the handle and locking plates having been thrown around as in said view;

Fig. 5 is a plan view of Fig. 4;

Fig. 6 is a view similar to Fig. 4, the liquid having lowered below the float upon termination of the vacuum, in falling to the level of the top of pipe 4 to drain off the surplus;

Fig. 7 is a sectional detail view of the float; and

Fig. 8 is a detail view in outer edge elevation of the locking plates, with the handle locked and the float in position corresponding to Figs. 1 and 3;

Fig. 9 is a similar view with the handle thrown around away from locking position, corresponding to Figs. 4 and 5.

Figure 1:
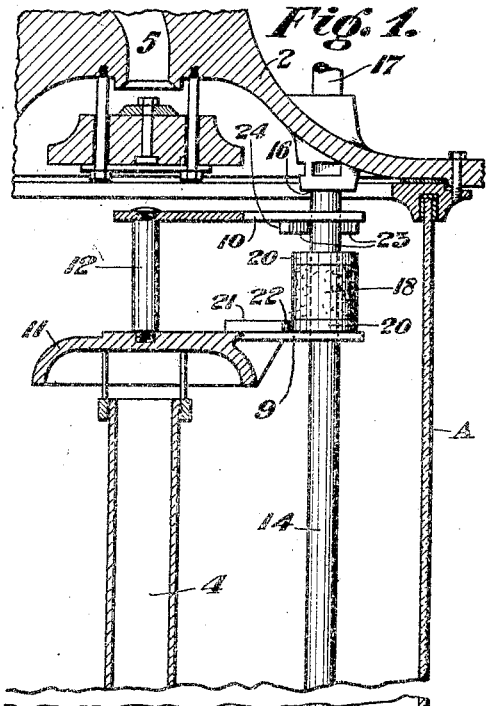
Fig. 1 is a partial sectional view of a measuring tank and its feed and return pipe in position for filling with the lower abutment plate and float interlocked.

In the drawings, A is the measuring tank, of glass, mounted between the top 2 and base 3 through which projects upwardly the vertically adjustable supply and overflow conduit 4. Air is exhausted from the hermetically sealed interior of the tank by conduit 5 and the measured liquid is drawn off to the user through a valve controlled conduit leading from base 2, not shown. Conduit 4 is provided below the stuffing box 6 with a fixedly attached lifting and lowering and rotating handle 7 adapted to be thrust around into one of a series of level-controlling and amount-determining notches 8, of which there are several. These are located a distance apart, corresponding to a unitary variation, as one gallon, so that by locating the handle in the desired notch, the top of conduit 4 is correspondingly located to drain off any surplus over the desired amount to be measured.

Somewhat above the top of conduit 4 are a lower abutment plate 9 and an upper abutment plate 10 fixedly connected as by the splash coping 11 and stud 12, so as to rise and fall and rotate with the conduit. Each plate is provided with an annular clearance slot 13 for a vertical guide rod 14 fixedly socketed at 15 in base 3 and at 16 to top 2, or to a connection therein for a hand pump connection 17. Embracing rod 14 is a float 18 of cork or other suitable material having a central bushing 19 and terminal flanges 20, 20, for engagement against the plate abutments.

Lower plate 9 is provided at each upper side of slot 13 with raised edges 21 terminating in abutment shoulders 22 inwardly beyond the end of the slot to leave a seating surface on the general upper surface of lower plate 9 for the float to rest upon, just beyond the abutments 22, when the plate is thrown around to bring such surface into register with the float, as held by rod 14, when handle 7 is thrown around into one of the locking notches 8. The upper plate 10 is provided with similar downwardly projecting edges 23 opposite such seating surface and terminating in abutment shoulders 24 substantially opposite shoulders 22, beyond which the plate 10 is of normal thickness opposite the raised edges 21 of the lower plate.

Figure 3:
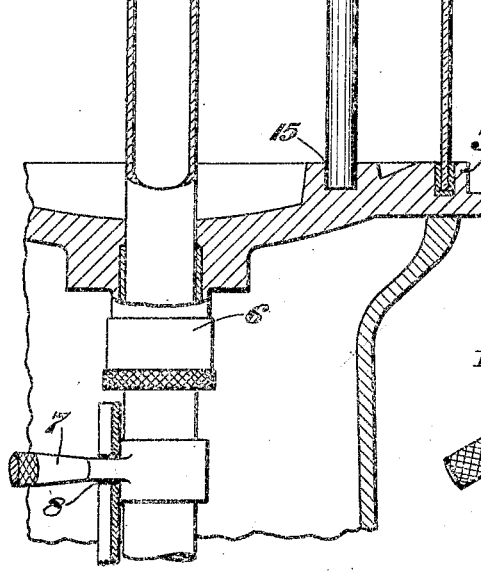
Fig. 3 is a plan view of Fig. 2.
Figure 3:
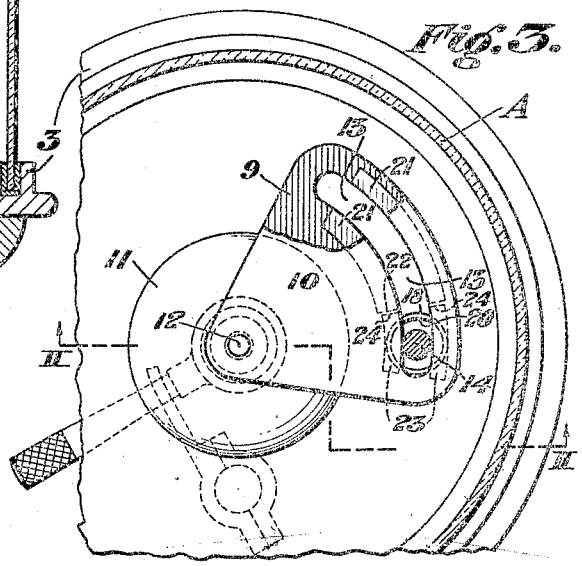

Float 18 is of a length slightly shorter than the vertical distance between the upper surface of raised edges 21 and the lower surface of downwardly extending edges 23, providing slight clearance. When arm 7 is in notch 8, as in Figs. 1 and 3, with the tube 4 set to measure, the float rests on lower plate 9 (Fig. 1), until the fluid rises, when it will also rise against faces 23. The lever may now be thrown around out of the notch as in Fig. 5, and when the surplus liquid lowers below the float, it will fall by gravity and rest on surfaces 21, as in Fig. 6. The tube must now be lowered, or if thrown around again into notch 8, the float will fall in front of shoulders 22, and the lever cannot again be thrown until the contents are withdrawn from the measuring tank and a new supply furnished, sufficiently high to again buoy up the float, as already described. Should the operator arrest the discharge before the measuring tank is entirely empty, it will be at once observed by the purchaser, so that no part of an already measured amount can be returned without detection.

The float being slidably mounted on rod 14 may rise and fall with the plates as the conduit 4 is raised or lowered, but will act to restrain rotation of them and the conduit by handle 7, either to unlock the handle from its notch when the float is resting against shoulders 22 of the lower plate or to permit insertion of the handle around from its open position into any slot when the float is buoyantly held against the under side of upper plate 10 and in arresting range of shoulders 24 of the upper plate.

Figure 2:
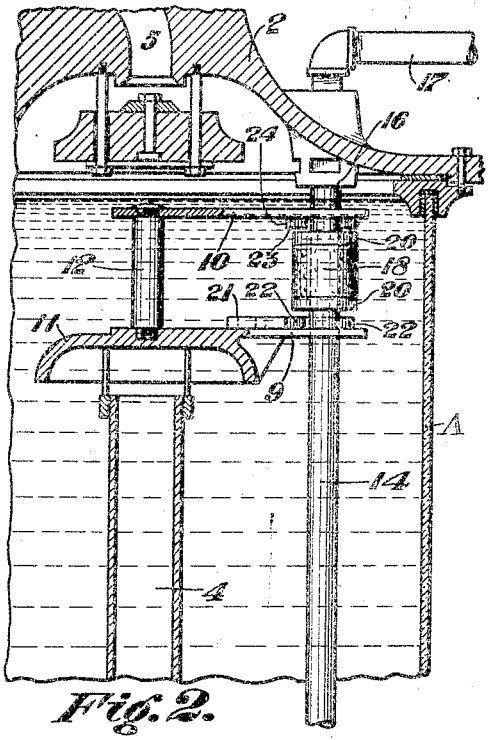
Fig. 2 is a similar view, after filling with the float raised by the liquid to release the lower abutment plate, taken on the line II—II of Fig. 3.

As shown in Fig. 1, with the tank empty and the conduit raised, or with it lowered, and with the handle 7 thrust around into one of the measuring and locking slots, the float is lowered by gravity and holding shoulders 22 are engaged, so that the handle cannot be released by lateral turning until, the outlet valve to the delivery pipe being closed and a vacuum formed by suction, liquid will rise through conduit 4 up to the interior of tank A and over the top of the conduit, as in Fig. 2. The float will then rise, releasing shoulders 22 so that the conduit may be rotated and raised or lowered, but the lateral shifting of handle 7 incident thereto will thrust the raised edges 21 around under the float, and the depending edges 23 will at the same time ride over beyond the float which will then at once rise by its buoyancy up behind shoulders 24, as in Fig. 4.

In such position, it is therefore impossible to reverse the handle 7 until the liquid commences to fall by overflow back through conduit 4, upon termination of the vacuum, as in Fig. 6.

Thus, with handle 7 in notch 8, and the liquid level below float 18, it falls and locks the plate by shoulders 22 preventing movement of the handle until the float again rises. The handle may be then released, and when edges 23 pass over the top of the float, it will rise further, coming into contact with the main under surface of plate 10 and in range of shoulders 24, as in Fig. 9, so that the plate cannot be shifted, or the arm 7 again inserted in notch 8 until the float falls again upon the lower edges 21. The float cannot, therefore, fall into locking position behind shoulders 22 until the arm is fully thrust into one of the notches, and the float will so hold it until the float again rises. Likewise, when the handle is thrown around out of the notch for vertical adjustment of the conduit 4, it cannot be reversed into locking position until, the surplus having overflowed back to the desired level, the float will fall out of range of shoulders 24 onto the edges 21, when the handle and plates may be again thrown around to locking position. This operation prevents any filling or emptying of the tank without actual locking, unlocking, and vertical movement of the handle and conduit and its plates.

The construction and operation will be readily understood from the foregoing description, and the utility of the invention will be appreciated by all those familiar with this class of mechanism. It operates to lock the supply and return conduit in such a manner as to ensure proper and fair operation of the machine at all times, to the entire satisfaction and security of the purchaser. The invention may be utilized in connection with various other constructions of mechanism in which the conditions are available, and various changes or modifications may be made by the skilled mechanic in detail construction without departing from the scope of the following claims.

What I claim is:

1. Locking mechanism for a liquid measuring apparatus of the class shown consisting of a vertically maintained rising and falling float, a vertically and annularly movable element having locking abutments for engagement by the float, and means for locking the movable element at varying heights.

2. Locking mechanism for a liquid measuring apparatus of the class shown consisting of a vertically maintained rising and falling float, a vertically and annularly movable element having locking abutments for engagement by the top and bottom of the float, and means for locking the movable element at varying heights.

3. Locking mechanism for a liquid measuring apparatus of the class shown provided with a vertically movable float, a vertical guide rod therefor extending upwardly through the float, a pair of locking plates one above and one below the float each having an annular clearance slot for the guide rod and locking abutments for engagement by the float, and means for actuating said plates together and for locking them at various heights.

4. In a liquid measuring apparatus having a vertically and rotatably movable supply and return conduit, a vertical guide rod, a freely movable float thereon, float-engaging plates connected with the conduit extending below and above the float in slotted engagement with the guide rod and having annularly arranged locking abutments for engagement by the float, and means for locking the conduit at varying heights.

5. In a liquid measuring apparatus having a vertically and rotatably movable supply and return conduit, a vertical guide rod, a freely movable float thereon, float-engaging plates connected with the conduit extending below and above the float in slotted engagement with the guide rod and having float-supporting strips on the under plate terminating in locking abutments and float-engaging strips on the upper plate terminating in locking abutments which are offset from the strips and abutments of the lower plate, and means for locking the conduit at varying heights.

6. In combination, a vertically and rotatably adjustable conduit provided above its top with a pair of laterally extending float-engaging elements each having an inwardly extending locking abutment, a vertically movable float between said elements and having a limited range of movement independent thereof, means for maintaining the float against lateral displacement with relation to the center of the conduit, and means for locking the conduit at varying heights.

7. In combination, a vertically and rotatably adjustable conduit provided above its top with a pair of laterally extending float-engaging elements each having an inwardly extending locking abutment, said locking abutments being arranged to engage opposite side portions of the float at top and bottom respectively, a vertically movable float between said elements and having a limited range of movement independent thereof, means for maintaining the float against lateral displacement with relation to the center of the conduit, and means for locking the conduit at varying heights.

8. In combination, a vertically and rotatably adjustable conduit provided above its top with a pair of laterally extending float-engaging elements each having an inwardly extending locking abutment, a vertically movable float between said elements and having a limited range of movement independent thereof, means for maintaining the float against lateral displacement with relation to the center of the conduit, and means for locking the conduit at various heights.

9. In combination, a vertically and rotatably adjustable conduit provided above its top with a pair of laterally extending float-engaging elements each having an inwardly extending locking abutment, a vertically movable float between said elements and having a limited range of movement independent thereof, means for maintaining the float against lateral displacement with relation to the center of the conduit, a handle for the conduit, and a series of holding sockets therefor at varying heights.

In testimony whereof I hereunto affix my signature.

GEORGE W. MacKENZIE.